(12) United States Patent
Khan et al.

(10) Patent No.: US 11,556,165 B2
(45) Date of Patent: *Jan. 17, 2023

(54) MANAGEMENT OF NEAR FIELD COMMUNICATIONS USING LOW POWER MODES OF AN ELECTRONIC DEVICE

(71) Applicant: Apple Inc., Cupertino, CA (US)

(72) Inventors: Ahmer A. Khan, Cupertino, CA (US); Joakim Linde, Cupertino, CA (US); Joseph Hakim, Boulder Creek, CA (US); Zachary A. Rosen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/067,599

(22) Filed: Oct. 9, 2020

(65) Prior Publication Data

US 2021/0026436 A1 Jan. 28, 2021

Related U.S. Application Data

(60) Division of application No. 16/279,612, filed on Feb. 19, 2019, now Pat. No. 10,838,481, which is a
(Continued)

(51) Int. Cl.
*G06F 1/3234* (2019.01)
*G06Q 20/32* (2012.01)
(Continued)

(52) U.S. Cl.
CPC ............ *G06F 1/3278* (2013.01); *G06F 21/35* (2013.01); *G06F 21/606* (2013.01);
(Continued)

(58) Field of Classification Search
CPC .......... H04M 2250/04; H04M 1/7253; H04M 2250/12; H04M 1/04; H04W 4/80;
(Continued)

(56) References Cited

U.S. PATENT DOCUMENTS 7,912,441 B2   3/2011   Bosch
8,282,009 B2   10/2012  Ahn et al.
(Continued)

FOREIGN PATENT DOCUMENTS

CN   102455 823   5/2012
CN   102725 779   10/2012

OTHER PUBLICATIONS

German Office Action from German Patent Application No. 112014003625.0, dated Dec. 1, 2020, 10 pages including English language summary.
(Continued)

*Primary Examiner* — Golam Sorowar
(74) *Attorney, Agent, or Firm* — BakerHostetler

(57) ABSTRACT

Systems, methods, and computer-readable media for managing near field communications during a low power management mode of an electronic device are provided that may make credentials of a near field communication ("NFC") component appropriately secure and appropriately accessible while also limiting the power consumption of the NFC component and of other components of the electronic device.

18 Claims, 7 Drawing Sheets

Related U.S. Application Data continuation of application No. 15/463,905, filed on Mar. 20, 2017, now Pat. No. 10,257,780, which is a continuation of application No. 14/063,433, filed on Oct. 25, 2013, now Pat. No. 9,603,090.

(60) Provisional application No. 61/863,549, filed on Aug. 8, 2013.

(51) Int. Cl.
| | |
|---|---|
| *G06F 21/35* | (2013.01) |
| *G06F 21/60* | (2013.01) |
| *H04W 52/02* | (2009.01) |
| *H04W 12/065* | (2021.01) |
| *H04W 12/06* | (2021.01) |
| *H04B 5/02* | (2006.01) |

(52) U.S. Cl.
CPC ........... *G06Q 20/3278* (2013.01); *H04B 5/02* (2013.01); *H04W 12/065* (2021.01); *H04W 12/068* (2021.01); *H04W 52/0209* (2013.01); *H04W 52/0251* (2013.01); *H04W 52/0254* (2013.01); *G06F 2221/2137* (2013.01); *Y02D 10/00* (2018.01); *Y02D 30/70* (2020.08)

(58) Field of Classification Search
CPC ............. H04W 12/06; H04W 52/0254; H04W 52/0251; H04W 52/028; H04W 88/02; H04W 12/00508; H04W 12/08; H04W 12/0806; H04W 12/12; H04W 24/02; H04W 4/008; H04W 4/026; H04W 4/48; H04W 52/0277; H04W 76/10; H04W 84/10; H04W 88/06; G06Q 20/3278; G06Q 20/322; G06Q 20/3674; G06Q 20/40145; G06Q 20/3255; G06Q 20/36; G06Q 20/085; G06Q 20/32; G06Q 20/3224; G06Q 20/341; G06Q 20/352; G06Q 20/385; G06Q 20/40; G06Q 20/4012; G06Q 20/405; G06Q 20/409; G06Q 20/425

See application file for complete search history.

(56) References Cited

U.S. PATENT DOCUMENTS

| | | | |
|---|---|---|---|
| 8,639,291 B1* | 1/2014 | Gailloux | H04W 52/0274 705/41 |
| 2009/0291634 A1 | 11/2009 | Saarisalo | |
| 2009/0307139 A1* | 12/2009 | Mardikar | G06Q 20/3265 726/19 |
| 2010/0317408 A1 | 12/2010 | Ferren et al. | |
| 2010/0332392 A1 | 12/2010 | Ueno et al. | |
| 2011/0313922 A1 | 1/2011 | Ben Ayed | |
| 2011/0215921 A1 | 9/2011 | Ben Ayed et al. | |
| 2011/0282785 A1 | 11/2011 | Chin | |
| 2012/0202423 A1 | 8/2012 | Tiedemann | |
| 2012/0238206 A1 | 9/2012 | Singh et al. | |
| 2012/0260119 A1 | 10/2012 | Gamier et al. | |
| 2013/0007473 A1 | 1/2013 | van der Lee | |
| 2013/0040563 A1* | 2/2013 | Kim | G06Q 20/3278 455/41.1 |
| 2013/0084803 A1 | 4/2013 | Hall | |
| 2013/0109443 A1 | 5/2013 | Eaton et al. | |
| 2013/0196594 A1 | 8/2013 | Moosavi | |
| 2013/0203347 A1 | 8/2013 | Moosavi | |
| 2013/0226792 A1 | 8/2013 | Kushevsky | |
| 2013/0300687 A1 | 11/2013 | Park | |
| 2013/0332354 A1 | 12/2013 | Rhee | |
| 2014/0040120 A1 | 2/2014 | Cho et al. | |
| 2014/0203988 A1 | 7/2014 | Yang | |
| 2014/0298434 A1 | 10/2014 | Prchal | |
| 2014/0302785 A1 | 10/2014 | Arora et al. | |
| 2015/0019892 A1* | 1/2015 | Agrawal | G06F 21/35 713/323 |

OTHER PUBLICATIONS

Chinese Office Action from Chinese Patent Application No. 201811090548.4, dated Jul. 20, 2021, 24 pages including English language translation.

\* cited by examiner

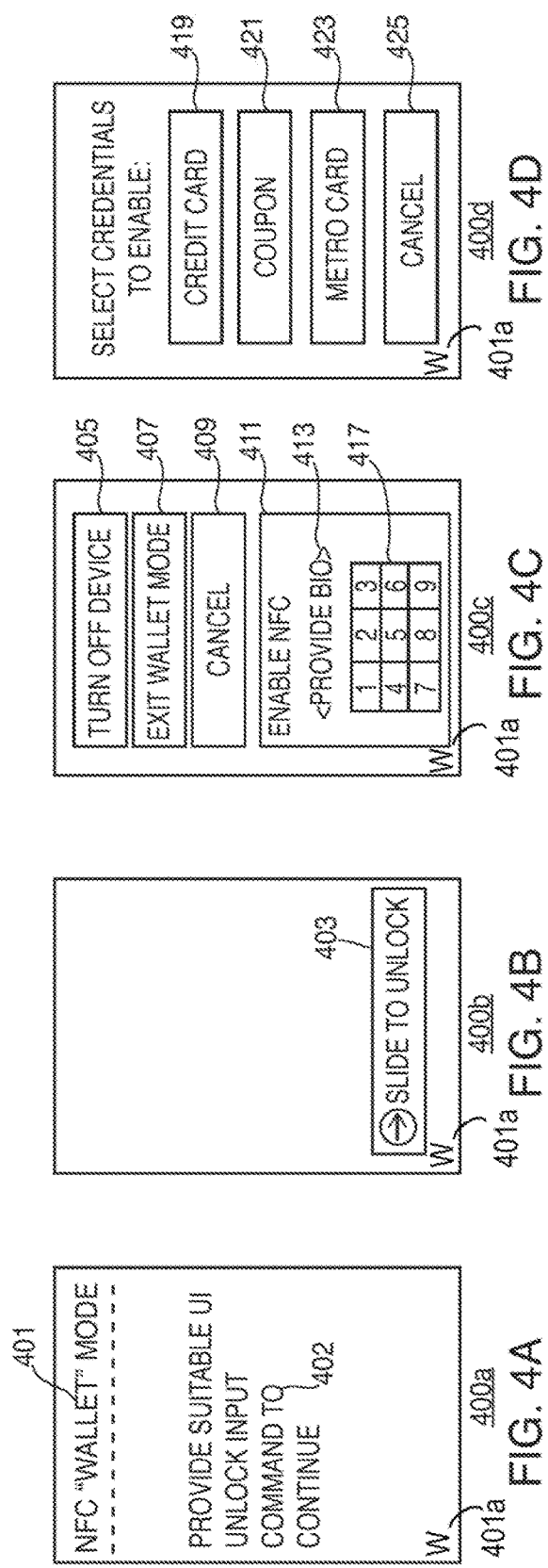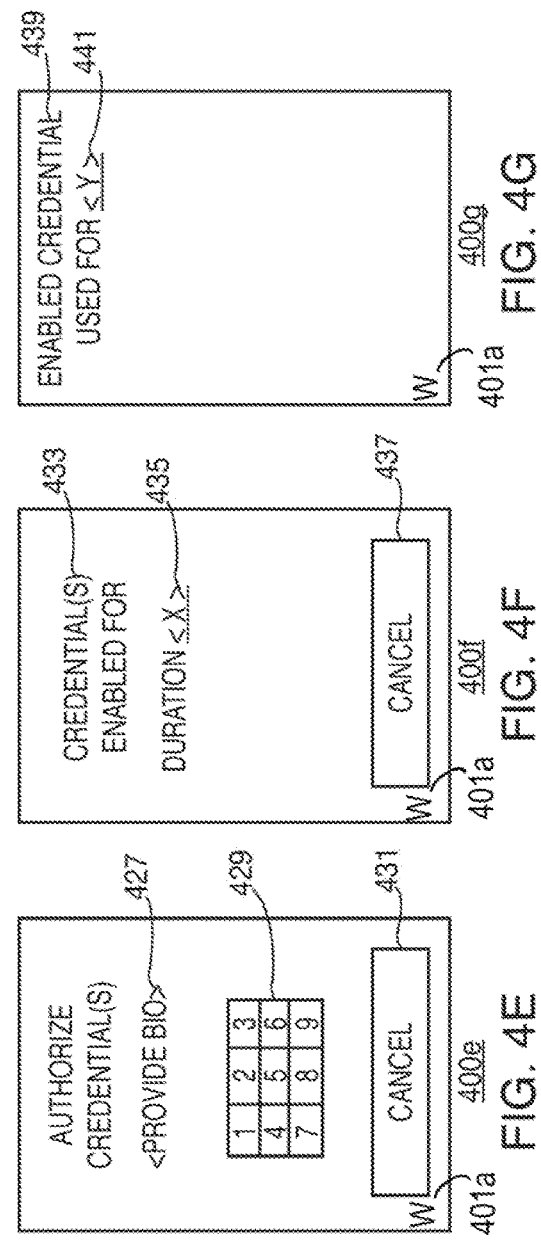

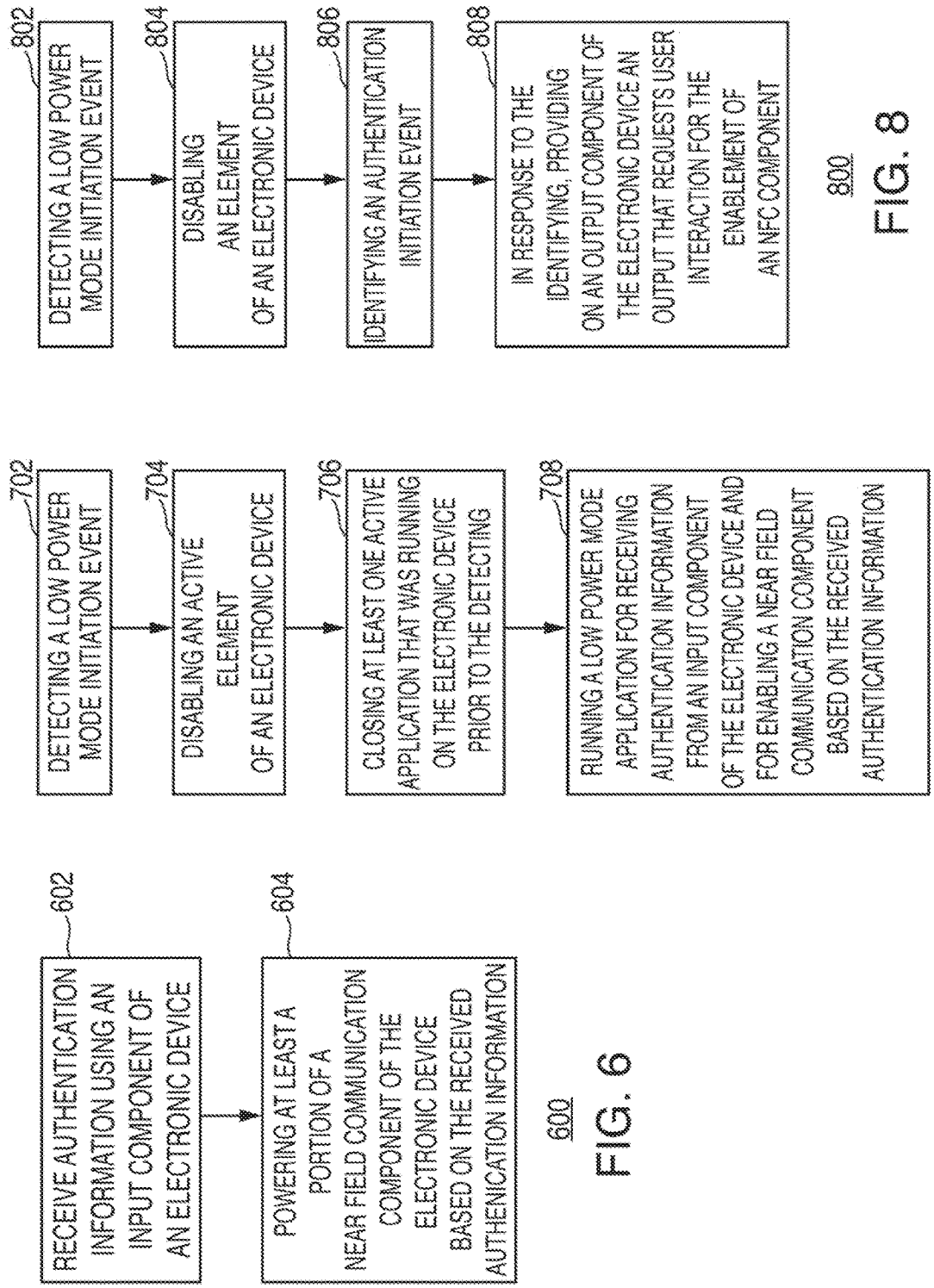

MANAGEMENT OF NEAR FIELD COMMUNICATIONS USING LOW POWER MODES OF AN ELECTRONIC DEVICE

CROSS-REFERENCE TO RELATED APPLICATION

This application is a divisional of U.S. patent application Ser. No. 16/279,612, entitled "MANAGEMENT OF NEAR FIELD COMMUNICATIONS USING LOW POWER MODES OF AN ELECTRONIC DEVICE," filed on Feb. 19, 2019, which is a continuation of U.S. patent application Ser. No. 15/463,905, entitled "MANAGEMENT OF NEAR FIELD COMMUNICATIONS USING LOW POWER MODES OF AN ELECTRONIC DEVICE," filed on Mar. 20, 2017, now U.S. Pat. No. 10,257,780, which is a continuation of U.S. patent application Ser. No. 14/063,433, entitled "MANAGEMENT OF NEAR FIELD COMMUNICATIONS USING LOW POWER MODES OF AN ELECTRONIC DEVICE," filed on Oct. 25, 2013, now U.S. Pat. No. 9,603,090, which claims the benefit of prior filed U.S. Provisional Patent Application No. 61/863,549 filed on Aug. 8, 2013, each of which is hereby incorporated by reference herein in its entirety.

TECHNICAL FIELD

This disclosure relates to the management of near field communications and, more particularly, to the management of near field communications using low power modes of an electronic device.

BACKGROUND OF THE DISCLOSURE

Portable electronic devices (e.g., cellular telephones) may be provided with near field communication ("NFC") components for enabling contactless proximity-based communications with another entity. Often times, these communications are associated with currency transactions or other secure data transactions that users rely on every day, such as credit card payments and public transportation ticketing. However, due to the limited amount of power available to battery operated devices, the NFC capabilities of such devices are often compromised or rendered unusable when their available power drops below certain thresholds.

SUMMARY OF THE DISCLOSURE

This document describes systems, methods, and computer-readable media for managing power usage in a device that is capable of near field communications and/or other wireless communications technologies.

For example, a method for operating an electronic device may include receiving authentication information using an input component of the electronic device. The method may also include powering at least a first portion of a near field communication component of the electronic device based on the received authentication information.

As another example, a method of operating an electronic device may include detecting a low power mode initiation event. In response to the detecting, the method may also include disabling an active element of the electronic device, where the active element includes at least one of a communications component and an output component. The method also includes closing at least one active application that was running on the electronic device prior to the detecting, and running a low power mode application on the electronic device. Running the low power mode application may include receiving authentication information from an input component of the electronic device and enabling a near field communication component of the electronic device based on the received authentication information.

As yet another example, a method of operating an electronic device may include detecting a low power mode initiation event. In response to the detecting, the method may also include disabling an element of the electronic device and identifying an authentication initiation event. In response to the identifying, the method may also include providing on an output component of the electronic device an output that requests user interaction for the enablement of a near field communication component of the electronic device.

As yet another example, a non-transitory computer-readable medium may include computer-readable instructions recorded thereon for detecting a low power mode initiation event on an electronic device and, in response to the detecting, disabling an element of the electronic device, identifying an authentication initiation event on the electronic device, and, in response to the identifying, providing on an output component of the electronic device an output that requests the enablement of a near field communication component of the electronic device.

As yet another example, an electronic device may include a near field communication component, an output component, and a processor. The processor may be configured to detect a low power mode initiation event, ensure that at least one function of the near field communication component is disabled in response to the detection of the low power mode initiation event, identify an authentication initiation event once it is ensured that the at least one function of the near field communication component is disabled, and, in response to the identification of the authentication initiation event, provide on the output component an output that requests user interaction with the electronic device for the enablement of the at least one function of the near field communication component.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 4A-4G are front views of screens of a graphical user interface of the electronic device of FIGS. 1-3 illustrating processes for managing near field communications; and FIGS. 5-8 are flowcharts of illustrative processes for managing near field communications.

DETAILED DESCRIPTION OF THE DISCLOSURE

Near field communications may be managed differently according to different power management modes of an electronic device. In certain low power management modes, certain components of an electronic device may be at least partially disabled or shut down to conserve power. When an electronic device operates in these modes, credentials of an NFC component in the device may be appropriately secure and/or appropriately accessible, while power consumption of the NFC component is limited or reduced. For example, when entering a low power management mode, an NFC component may be initially disabled and user authentication may be required to re-enable the NFC component for use during the low power management mode. An output component, such as a display, may also be initially disabled upon entering the low power management mode, yet the output component may be re-enabled at some later point during the low power management mode in order to prompt a user to authenticate himself or herself such that the NFC component may be re-enabled. One or more applications, such as all non-native applications, running on the device prior to entering the low power management mode may be disabled upon entering the low power management mode and a specific low power management mode application may be launched to control the operation of the NFC component and/or any other components of the electronic device during the low power management mode. The low power management mode may be initialized in response to a user request or in response to the remaining power of a power supply dropping below a specific threshold, whereas user authentication of the NFC component during the low power management mode may be initialized in response to a user request or in response to an NFC terminal being detected within a specific proximity of the electronic device.

Figure 1:
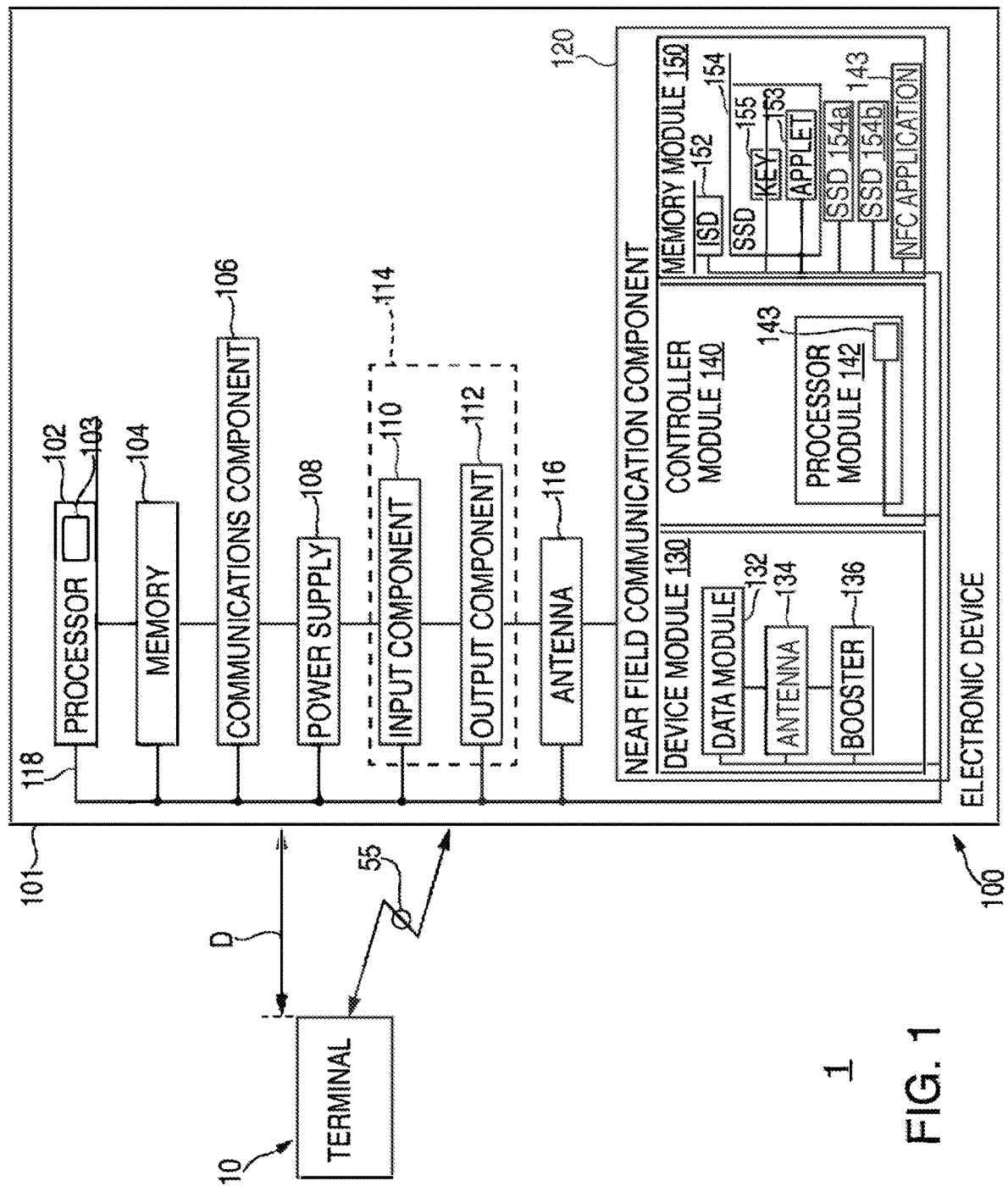
FIG. 1 is a schematic view of an illustrative communications system that includes an electronic device for managing near field communications.

FIG. 1 is a schematic view of an illustrative communications system 1 that may include a terminal 10 and an electronic device 100 for managing near field communications 55 with terminal 10 in accordance with some embodiments. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to managing near field communications) and, in other embodiments, electronic device 100 may perform multiple functions (e.g., a device that manages near field communications, plays music, and receives and transmits telephone calls).

Electronic device 100 may be any portable, mobile, hand-held, or miniature electronic device that may be configured to manage near field communications wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 1. For example, electronic device 100 may include motion-sensing circuitry, a compass, any other suitable components, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoW-PAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, rumblers, vibrators, or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 1, processor 102 may be used to run one or more applications, such as an application 103. Application 103 may include, but is not limited to, one or more operating system applications, firmware applications, media playback applications, media editing applications, NFC low power mode applications, biometric feature-processing applications, or any other suitable applications. For example, processor 102 may load application 103 as a user interface program to determine how instructions or data received via an input component 110 or other component of device 100 may manipulate the way in which information may be stored and/or provided to the user via an output component 112. Application 103 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contact-less transactions or communications 55 between electronic device 100 and terminal 10 (e.g., a payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 560 Mbps), and may comply with any suitable standards, such as the TransferJet™ protocol. Communication between NFC component 120 and terminal 10 may occur within any suitable close range distance D between device 100 and terminal 10, such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., terminal 10).

NFC component 120 may include any suitable modules for enabling contactless proximity-based communication 55 between electronic device 100 and terminal 10. As shown in FIG. 1, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to terminal 10 as part of a contactless proximity-based or NFC communication 55. Additionally or alternatively, NFC data module 132 may be configured to contain, route, or otherwise receive any suitable data that may be received by NFC component 120 from terminal 10 as part of a contactless proximity-based communication 55.

NFC transceiver or NFC antenna 134 may be any suitable antenna or other suitable transceiver circuitry that may generally enable communication of communication 55 from NFC data module 132 to terminal 10 and/or to NFC data module 132 from terminal 10. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, or GPS communication between electronic device 100 and another remote entity, while NFC component 120 may leverage antenna 116 to enable contactless proximity-based or NFC communication 55 between NFC data module 132 of NFC device module 130 and another entity (e.g., terminal 10). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication 55 to terminal 10. For example, shared antenna 116 may require amplification from booster 136 before antenna 116 (e.g., a non-loop antenna) may be properly enabled for communicating contactless proximity-based or NFC communication 55 between electronic device 100 and terminal 10 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating NFC communication 55 between electronic device 100 and terminal 10. NFC processor module 142 may exist as a separate component, may be integrated into another chipset, or may be integrated with processor 102, for example, as part of a system on a chip ("SoC"). As shown in FIG. 1, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103). NFC controller module 140 may include one or more protocols, such as the Near Field Communication Interface and Protocols ("NFCIP-1"), for communicating with another NFC device (e.g., terminal 10). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 55) from NFC tags (e.g., from terminal 10) to NFC data module 132, a peer-to-peer mode for exchanging data (e.g., communication 55) with another NFC enabled device (e.g., terminal 10), and a card emulation mode for allowing another NFC enabled device (e.g., terminal 10) to read information (e.g., communication 55) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., terminal 10). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication 55 between electronic device 100 and terminal 10. NFC memory module 150 may be embedded within NFC device hardware or within an NFC integrated circuit ("IC"). NFC memory module 150 may be tamper resistant and may include at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC memory module 150 may be a portion of memory 106 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems.

NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A specific supplemental security domain ("SSD") 154 (e.g., one of SSDs 154-154b) may be associated with a specific credential (e.g., a specific credit card credential or a specific public transit card credential) that may provide specific privileges or payment rights to electronic device 100. Each SSD 154 may have its own manager key 155 for its own application or applet 153 that may need to be activated to enable a specific credential of that SSD 154 for use by NFC device module 130 as an NFC communication 55. For example, a particular SSD 154 may be associated with a particular credit card credential. However, that particular credential may only be communicated as an NFC communication 55 to terminal 10 by NFC component 120 (e.g., that particular credential may only be accessible by NFC data module 132) when a particular applet 153 of that particular SSD 154 has been enabled or otherwise activated or unlocked for such use. Security features may be provided for enabling use of NFC component 120, as described below, that may be particularly useful when transmitting payment information, such as credit card information or bank account information to terminal 10. Such security features also may include a secure storage area that may have restricted access. For example, user authentication via personal identification number ("PIN") entry or via user interaction with a biometric sensor may need to be provided to access the secure storage area. In certain embodiments, some or all of the security features may be stored within NFC memory module 150. Further, security information, such as an authentication key, for communicating with terminal 10 may be stored within NFC memory module 150. In certain embodiments, NFC memory module 150 may include a microcontroller embedded within electronic device 100.

Terminal 10 may include a reader for detecting, reading, or otherwise receiving NFC communication 55 from electronic device 100 (e.g., when electronic device 100 comes within a certain distance or proximity D of terminal 10). Accordingly, it is noted that NFC communication 55 between terminal 10 and electronic device 100 may occur wirelessly and, as such, may not require a clear "line of sight" between the respective devices. As mentioned, NFC device module 130 may be passive or active. When passive, NFC device module 130 may only be activated when within a response range D of a suitable reader of terminal 10. For instance, a reader of terminal 10 may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to terminal 10 as NFC communication 55. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to terminal 10 as NFC communication 55, rather than reflect radio frequency signals, as in the case of a passive NFC device module 130.

While NFC component 120 has been described with respect to near field communication, it is to be understood that component 120 may be configured to provide any suitable contactless proximity-based mobile payment or any other suitable type of contactless proximity-based communication 55 between electronic device 100 and terminal 10. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
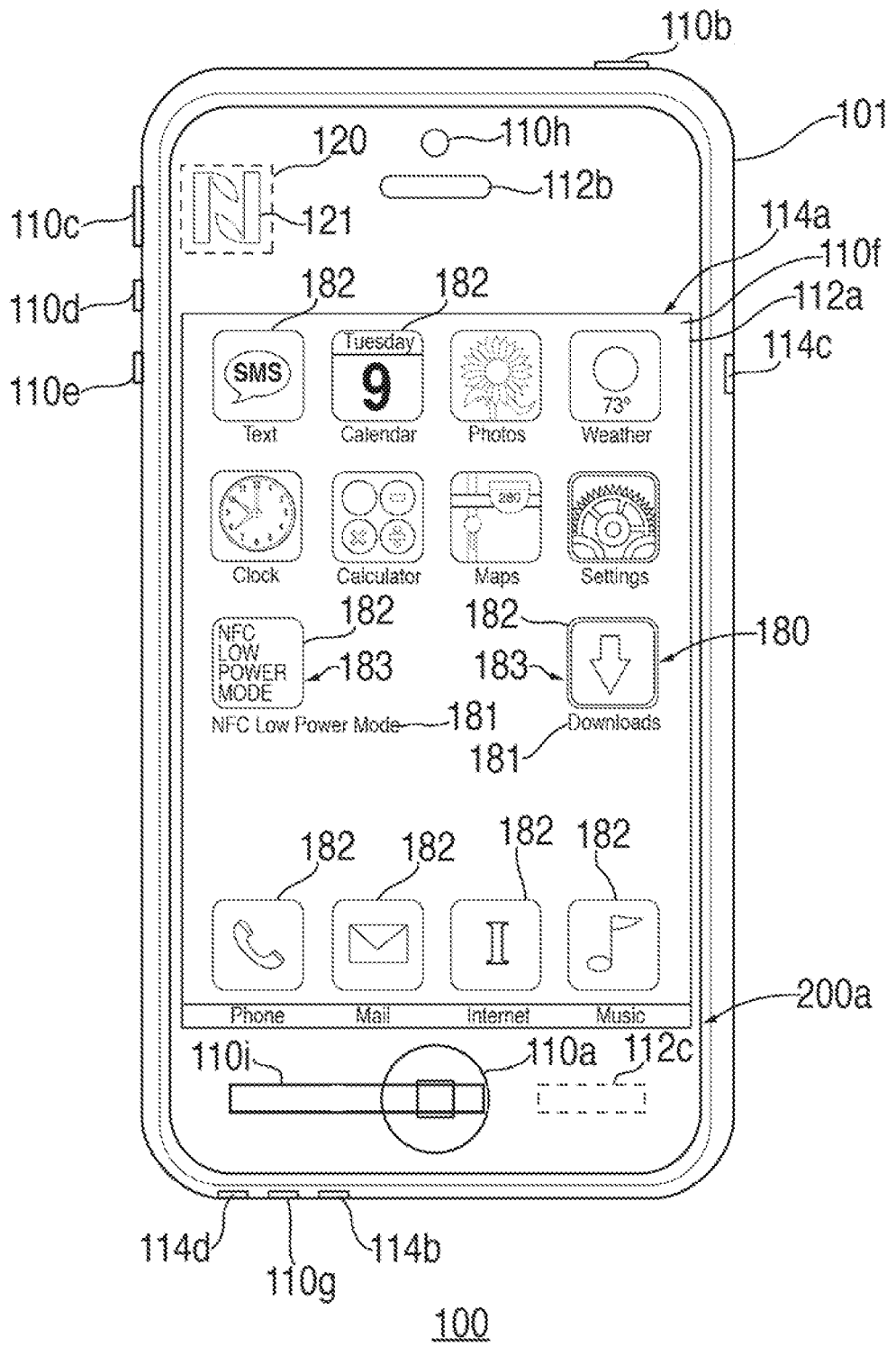
FIG. 2 is a front view of the electronic device of FIG. 1.

As shown in FIG. 2, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 143) that may be displayed in all or some of the areas of display output component 112a. One or more of user input components 110a-110i may be used to navigate through GUI 180. For example, one user input component 110 may include a scroll wheel that may allow a user to select one or more graphical elements 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with an NFC LOW POWER MODE textual indicator 181 (i.e., specific icon 183) is selected, device 100 may launch or otherwise access a specific NFC low power mode or wallet mode application (e.g., application 143) and may display screens of a specific user interface that may include one or more tools or features for interacting with NFC component 120 in a specific manner (see, e.g., FIGS. 4A-4G for specific examples of such displays of GUI 180 during an NFC low power mode). For each application, screens may be displayed on display output component 112a and may include various user interface elements. Additionally or alternatively, for each application, various other types of non-visual information may be provided to a user via various other output components 112 of device 100.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, California. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 2, at least a portion of biometric input component 110i may be incorporated under or otherwise combined with input component 110a or any other suitable I/O component of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to terminal 10 via antenna 116 and/or antenna 134 (not shown in FIG. 2). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Figure 3:
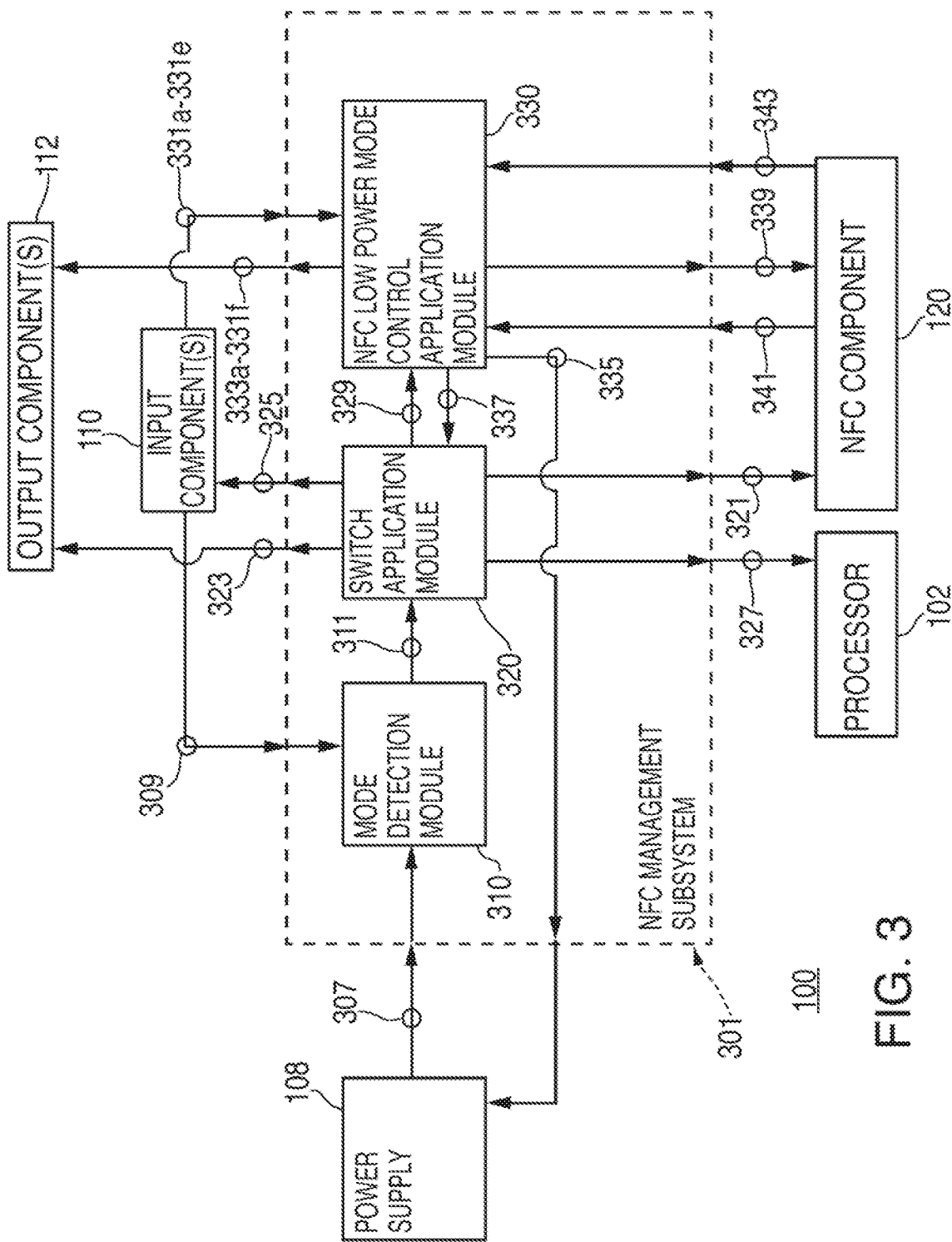
FIG. 3 is a schematic view of an illustrative portion of the electronic device of FIGS. 1 and 2.

To facilitate the following discussion regarding the operation of electronic device 100 in managing near field communications (e.g., communications 55 with terminal 10) during an NFC low power mode of operation, reference is made to a schematic diagram of an NFC management subsystem 301 of electronic device 100 (e.g., as shown in FIG. 3) and front views of screens 400*a*-400*g* that may be representative of a graphical user interface of electronic device 100 during such near field communication management (e.g., as shown in FIGS. 4A-4G). The operation described may be achieved with a wide variety of graphical elements and visual schemes. Therefore, the embodiments of FIGS. 4A-4G are not intended to be limited to the precise user interface conventions adopted herein. Rather, embodiments may include a wide variety of user interface styles.

FIG. 3 shows a schematic view of near field communication management subsystem 301 of electronic device 100 that may be provided to manage near field communications during different modes of electronic device 100. For example, NFC management subsystem 301 may determine when to utilize a low power NFC mode of electronic device 100 and/or how to manage NFC component 120 during such a low power NFC mode (e.g., how to make credentials of NFC component 120 appropriately secure and/or appropriately accessible during such a low power NFC mode).

Electronic device 100 can be configured to operate according to different power management modes for controlling and managing power consumption by the various components of device 100. As shown in FIG. 3, for example, NFC management subsystem 301 may include a mode detection module 310 that may be configured to determine when to enter a particular one of various power management modes of electronic device 100. For example, mode detection module 310 may be configured to determine when to enter a particular one of many possible power management modes, such as a low power NFC mode of electronic device 100. In particular, mode detection module 310 can be configured to switch the operation of electronic device 100 amongst various particular power management modes for reducing power consumption when device 100 is not connected to a remote power supply (e.g., when power supply 108 is not plugged into a wall socket). For example, operation of device 100 in a particular power management mode can prevent non-essential power intensive processes from being performed by device 100 while device 100 is being powered by a battery that has less than a certain threshold of power potential remaining.

As shown in FIG. 3, mode detection module 310 may be configured to poll for or otherwise receive power level data 307 from power supply 108, where power level data 307 may be indicative of the amount of power remaining in power supply 108 (e.g., when power supply 108 may be a battery whose power level may diminish during use). When mode detection module 310 detects that received power level data 307 of power supply 108 has dropped below a particular threshold (e.g., below a 3.4 volts voltage threshold or any other suitable threshold), mode detection module 310 may be configured to generate a switch command 311 that may be configured to switch electronic device 100 to a low power NFC power management mode (e.g., a "wallet" power management mode). For example, as shown in FIG. 3, when mode detection module 310 detects that received power level data 307 is indicative of a particular characteristic of power supply 108 (e.g., that power supply 108 has dropped below a particular power threshold), mode detection module 310 may be configured to generate switch command 311 and provide switch command 311 to a switch application module 320 of NFC management subsystem 301.

As another example of an initiation event of a low power NFC mode or a wallet mode that may be detectable by mode detection module 310, mode detection module 310 may be configured to receive input mode selection data 309 from an input component 110 (e.g., one or more of input components 110*a*-110*i*). Such input mode selection data 309 may be any suitable data generated by input component 110 that may be indicative of a desire to enter such a wallet mode. For example, input mode selection data 309 may be indicative of a user selecting "NFC LOW POWER MODE" icon 183 of GUI 180 using touch screen input component 110*f* of I/O component 114*a* of FIG. 2, and this may be recognized by mode detection module 310 as an initiation event for entering the wallet mode. Thus, when mode detection module 310 receives such specific input mode selection data 309, mode detection module 310 may be configured to generate switch command 311 and provide switch command 311 to switch application module 320 of NFC management subsystem 301. Therefore, in addition to or as an alternative to device 100 switching to a wallet power management mode when power supply 108 is below a certain power threshold, such a low power NFC power management mode may be entered at a user's discretion or during any other suitable situation.

Regardless of why mode detection module 310 may generate switch command 311 and transmit switch command 311 to switch application module 320 (e.g., in response to a particular received power level data 307 and/or in response to a particular received input mode selection data 309), switch application module 320 may be configured to switch electronic device 100 into a low power NFC or wallet power management mode in response to receipt of such a switch command 311. This switch process can include switch application module 320 generating and transmitting one or more disabling commands to one or more components of device 100 for at least partially shutting down, removing power from, or otherwise at least partially disabling at least one function of such components. This may reduce the power consumption of one or more components of device 100 and/or may at least partially disable one, some, or all components of device 100 that are not necessary for at least initially operating device 100 in the wallet power management mode.

For example, in response to receipt of a switch command 311, switch application module 320 generate and transmit an NFC disabling command 321 to NFC component 120 as part of the switching process to the wallet power management mode. NFC disabling command 321 may be configured to be received by any suitable element of NFC component 120 such that at least one credential previously enabled by NFC component 120 prior to receipt of command 321 may be disabled in response to receipt of command 321. As one particular example, command 321 may disable NFC antenna 134 and/or booster 136 of NFC device module 130 when command 321 is received by NFC component 120, such that no NFC communications 55 may be transmitted by NFC component 120 to terminal 10 after such disablement. As another example, command 321 may disable a first applet 153 of a first SSD 154 of NFC memory module 150 when command 321 is received by NFC component 120, such that no NFC communications 55 associated with the credentials of that first applet 153 may be transmitted by NFC component 120 to terminal 10 after such disablement. In some embodiments, command 321 may disable every applet 153 of every SSD 154 of NFC memory module 150 when command 321 is received by NFC component 120, such that no NFC communications 55 associated with any credential of any applet 153 of any SSD 154 may be transmitted by NFC component 120 to terminal 10 after such disablement. However, in other embodiments, command 321 may disable only some specific applets 153 of some SSDs 154 of NFC memory module 150 when command 321 is received by NFC component 120, such that NFC communications 55 associated with the credentials of those specific applets (e.g., credit card credentials, which may warrant a high security level) may not be transmitted by NFC component 120 to terminal 10 after such disablement, but such that other NFC communications 55 that are associated with the credentials of other specific applets (e.g., simple transit system credentials, such as for the subway, which may not warrant a high security level) may be transmitted by NFC component 120 to terminal 10 after such disablement. When received by NFC component 120, NFC disabling command 321 may be configured to shut down, remove power from, or otherwise at least partially disable at least one function of NFC component 120.

In addition to or as an alternative to generating NFC disabling command 321, switch application module 320 may be configured to switch electronic device 100 into a low power NFC or wallet power management mode by generating and transmitting an output component disabling command 323 to at least one output component 112 (e.g., at least one of output components 112a-112c). When received by that output component 112, output component disabling command 323 may be configured to shut down, remove power from, or otherwise at least partially disable at least one function of that output component 112. For example, as shown in FIG. 4A, in response to display output component 112a receiving such a disabling command 323, display output component 112a may be configured to provide a blank screen 400a (e.g., display output component 112a may be turned off) as opposed to screen 200a of FIG. 2 that may include various icons 182. Alternatively, as shown in screen 400a may include only a simple message or other element 401/402, which may indicate that device 100 is now in the wallet power management mode (e.g., display of simple element 401/402 of such a screen 400a may be static and/or may only reside on a portion of display output component 112a, which may require less power than providing display of screen 200a). As another alternative, a simple icon 401a, which may indicate to a user that device 100 is now in the wallet power management mode and not another mode where certain other functions may be possible, may be displayed on screen 400a (as well as all other screens 400b-400g of FIGS. 4B-4G).

Similarly, switch application module 320 may be configured to switch electronic device 100 into a low power NFC or wallet power management mode by generating and transmitting an input component disabling command 325 to at least one input component 110 (e.g., one or more of input components 110a-110i). When received by that input component 110, input component disabling command 325 may be configured to shut down, remove power from, or otherwise at least partially disable at least one function of that input component 110. Similarly, switch application module 320 may be configured to switch electronic device 100 into a low power NFC or wallet power management mode by generating and transmitting an application disabling command 327 to processor 102. When received by processor 102, application disabling command 327 may be configured to shut down or otherwise at least partially disable one or more applications currently being run by processor 102 (e.g., to force quit all non-native applications that were running on device 100 prior to the generation of that application disabling command 327). This may reduce the power consumption of processor 102 going forward with the switch to the wallet mode. Moreover, additionally or alternatively, switch application module 320 may be configured to switch electronic device 100 into a low power NFC or wallet power management mode by generating and transmitting one or more additional disabling commands (not shown) to at least one other component of device 100 (e.g., memory 104, communication component 106, antenna 116, etc.), such that, when received by that device component, that component disabling command may be configured to shut down, remove power from, or otherwise at least partially disable at least one function of that device component.

Therefore, switch application module 320 may be configured to initiate the transition of electronic device 100 into a wallet power management mode by generating and transmitting one or more disabling commands (e.g., disabling commands 321, 323, 325, 327, etc.) that may be configured to shut down, remove power from, or otherwise at least partially disable one, some, or all components of device 100 that are not necessary for at least initially operating device 100 in the wallet power management mode. For example, as mentioned, one or more disabling commands of switch application module 320 may be configured to at least partially turn off one or more input components 110, one or more output components 112, processor 102 or at least one or more applications being run by processor 102, at least some of memory 104, at least some or all of communications component 106, antenna 116, and/or some or all of NFC component 120. When at least initially operating in such a wallet mode, electronic device 100 may be configured to refrain from providing power to or otherwise enabling particular device components that are not necessary for securely managing NFC component 120. For example, in response to receiving one or more disabling commands from switch application module 320, electronic device 100 can turn off a hard drive (e.g., memory 104), dim or turn off a display (e.g., output component 112a), place a processor (e.g., processor 102) in a low-power "sleep" or "hibernate" mode, and/or completely or partially disable NFC component 120. Some or all of the power management settings of NFC management subsystem 301 can be set automatically or by a user of device 100 (e.g., the user may define a duration and/or a condition before device 100 switches between particular power management modes and/or the components that may be at least partially disabled or turned off when switching between different power management modes, such as the wallet mode). By forcing electronic device 100 to operate in such a wallet mode, switch application module 320 may eventually allow electronic device 100 to securely utilize NFC component 120 for communications 55 in an efficient manner (e.g., until power supply 108 is no longer able to power electronic device 100 to operate in that mode).

Therefore, at least certain modules of NFC management subsystem 301 may be configured as a power management unit ("PMU") that may be coupled to at least one source of power, such as power supply 108. Such a PMU may include a microcontroller and can be configured to govern the power functions of device 100. Such a PMU may include its own memory (e.g., loaded with software and/or firmware), processor with input/output functionality and timers, as well as one or more converters for measuring the power provided by power supply 108. Moreover, additionally or alternatively, such a PMU may include a backup power source that can power components of NFC management subsystem 301 even when device 100 is completely shut down, such that, for example, the current time of a real-time clock may be maintained. Such a PMU may be responsible for coordinating certain functions of device 100, including, but not limited to, monitoring power connections and battery charges, controlling power provided to other components of device 100, shutting down certain components of device 100 when they are left idle or deemed to be currently unnecessary to properly operate device 100, regulating a real-time clock of device 100, and controlling various power management modes of device 100. A battery control circuit or power management stage may be connected to a battery and to the base-band/firmware processor. One or more dedicated connections from such a PMU and/or from power supply 108 to various elements of NFC component 120 (e.g., device module 130, controller module 140, and/or memory module 150) may also be provided by NFC management subsystem 301. These additional connections may be provided to enable a battery control circuit or power supply circuit to selectively power various components of device 100, and especially the various components necessary to perform NFC communication with terminal 10.

When switch application module 320 has received switch command 311 from mode detection module 310 and has thereafter generated and transmitted one or more disabling commands (e.g., disabling commands 321, 323, 325, etc.) for at least partially disabling one, some, or all components of device 100 that are not necessary for at least initially operating device 100 in the wallet power management mode, switch application module 320 may also be configured to generate and transmit a launching command 329 to an NFC low power mode control application module 330 of NFC management subsystem 301. In response to receiving launching command 329, control application module 330 may be configured to launch and run at least one application (e.g., application 143) that may be specifically tailored to appropriately manage and/or otherwise control electronic device 100 in the low power NFC or wallet power management mode. Therefore, operation of device 100 in such a low power NFC or wallet power management mode may be based on one or more applications accessible to electronic device 100 (e.g., application 143) and/or based on any input instructions being received by electronic device 100 (e.g., via input component 110) that may control such an application.

When control application module 330 receives launching command 329 for managing device 100 in the wallet power management mode, NFC component 120 may be initially configured by NFC disabling command 321 to be in a disabled antenna mode (e.g., where antenna 116 and/or antenna 134 is unable to receive or transmit any NFC communications 55 (e.g., where booster 136 is disabled such that antenna 116 may not be able to communicate NFC communications 55)). Alternatively, when control application module 330 receives launching command 329 for managing device 100 in the wallet power management mode, NFC component 120 may be initially configured by NFC disabling command 321 to be in a passive antenna mode (e.g., where antenna 116 and/or antenna 134 may be passively enabled for NFC communication by terminal 10 when within response range D of terminal 10). As yet another alternative, when control application module 330 receives launching command 329 for managing device 100 in the wallet power management mode, NFC component 120 may be initially configured by NFC disabling command 321 to be in an active antenna mode (e.g., where antenna 116 and/or antenna 134 may be actively enabled for NFC communication by electronic device 100 itself (e.g., by power supply 108)). It is to be understood that when NFC component 120 is initially configured by NFC disabling command 321 to be in either the passive or active antenna modes, one or more other elements of NFC component 120 (e.g., an applet 153 of one or more SSDs 154) may be initially disabled by NFC disabling command 321 to prevent a passive/active antenna from communicating a credential of NFC component 120 as communication 55 to terminal 10.

Continuing with the embodiments in which NFC component 120 may be initially configured by NFC disabling command 321 to be in a disabled antenna mode, electronic device 100 may not be able to detect when device 100 is within an NFC response range D of terminal 10 (e.g., via antenna 116 and/or via antenna 134) and may not be able to communicate NFC communication 55 with terminal 10. Instead, control application module 330 may be configured to wait for one or more input commands that may be indicative of a user's desire to interact with device 100 for potentially enabling NFC component 120 for an NFC communication 55. For example, once initially switched to the wallet mode, device 100 may provide screen 400a (e.g., a blank screen or turned off display 112a) and may wait for a suitable UI unlock input command 331a from any suitable input component 110. Such a suitable unlock input command 331a may be any input command that can be received by an input component 110 for indicating a user's desire to interact with device 100 in the wallet mode for potentially enabling at least a portion of NFC component 120. For example, UI unlock input command 331a may be a simple user interaction with home button input component 110a. In such embodiments, all other input components 110 of device 100 may have been initially disabled by input component disabling command(s) 325, except for input component 110a that may be frequently polled by control application module 330 for detecting such a UI unlock input command 331a. This may enable device 100 to use as little power as possible with respect to its input components 110 while still enabling a user interaction with device 100 during the wallet mode that may indicate a user's potential desire to enable at least a portion of NFC component 120 for use during the wallet power management mode. It is to be understood that control application module 330 may be configured to detect any suitable user interaction via any suitable input component 110 or any suitable combination of interactions via any suitable combination of input components 110 as an acceptable UI unlock input command 331a. As shown in FIG. 4A, initial wallet mode screen 400a may include a message 402 that may prompt a user to provide a suitable UI unlock input command 331a for utilizing the wallet power management mode, where such message may reassure the user that device 100 is in the wallet mode and not completely shut down. Alternatively, initial wallet mode screen 400a may be blank and/or display output component 112a may be completely turned off.

Once an acceptable UI unlock input command 331a has been received by control application module 330, control application module 330 may provide a user with various options for utilizing device 100 in various ways while operating in the wallet power management mode. For example, as shown in FIG. 3, control application module 330 may generate and transmit a confirm UI unlock command 333a to at least one output component 112 of device 100 in response to receiving an acceptable UI unlock input command 331a. Confirm UI unlock command 333a may be received by an output component 112 and may configure that output component 112 to prompt a user to confirm his or her desire to interact with device 100 to potentially utilize NFC component 120 (e.g., to confirm acceptable UI unlock input command 331a). For example, as shown in FIG. 4B, output display component 112a may be configured to provide screen 400b in response to receiving UI unlock command 333a from control application module 330. Screen 400b may prompt a user to interact with device 100 in one or more ways to confirm that he or she wishes to potentially utilize NFC component 120. As shown, screen 400b may include a prompt 403 that may ask a user to slide an element along a particular path of screen 400b. Therefore, confirm UI unlock command 333a may also be received by input component 110f of I/O component 114a for enabling such user interaction with input component 110f of I/O component 114a if input component 110f had previously been disabled (e.g., by command 325). It is to be understood that confirm UI unlock command 333a may be received by and may configure any suitable combination of output components 112 other than display output component 112a to prompt a user to confirm his or her UI unlock command 331a. For example, confirm UI unlock command 333a may be received by and may configure audio speaker output component 112b to audibly ask a user to confirm his or her UI unlock command 331a.

In response to a confirm UI unlock command 333a prompting a user via an output component 112 to confirm his or her UI unlock command 331a, an input component 110 may be configured to receive and transmit such a confirmation as UI unlock confirmation data 331b to control application module 330. For example, a user may slide the element along the particular path of screen 400b such that touch input component 110f of I/O component 114a may transmit UI unlock confirmation data 331b to control application module 330. Any other suitable input component 110 (e.g., microphone input component 110g) may be configured to receive and transmit a suitable UI unlock confirmation data 331b to control application module 330 (e.g., a user's voice command). Alternatively, if no UI unlock confirmation data 331b is received (e.g., after a certain duration of time since data 331a is received), control application module 330 may once again return to screen 400a (e.g., a state where a user must provide a new suitable UI unlock input command 331a).

Once acceptable UI unlock confirmation data 331b is received, control application module 330 may be configured to provide a user with an ability to authenticate his or her right to access NFC component 120 of device 100. For example, as shown in FIG. 3, in response to receiving acceptable UI unlock confirmation data 331b, control application module 330 may generate and transmit an NFC component authentication request command 333b to at least one output component 112 of device 100. NFC component authentication request command 333b may be received by an output component 112 and may configure that output component 112 to prompt a user to provide device 100 with any suitable authentication information that may prove the user's right to enable at least a portion of NFC component 120 in the wallet power management mode. For example, as shown in FIG. 4C, NFC component authentication request command 333b may be received by display output component 112a and may configure display output component 112a to provide screen 400c to the user. Screen 400c may include turn off device option 405, exit wallet mode option 407, cancel authentication option 409, and/or authentication prompt 411. User selection of turn off device option 405 may cause control application module 330 to completely power down device 100 (e.g., by transmitting a shutdown command 335 to power supply 108). User selection of exit wallet mode option 407 may cause control application module 330 to return to a previous power management mode of device 100 (e.g., by transmitting a wallet mode exit command 337 to switch application module 320). Whereas user selection of cancel authentication option 409 may cause control application module 330 to once again provide screen 400a and/or await another acceptable UI unlock input command 331a.

Authentication prompt 411 may include one or more suitable NFC component authentication options (e.g., one or more of NFC component authentication options 413 and 417) that a user may follow for attempting to authenticate himself or herself for general use of NFC component 120. NFC component authentication option 413 may prompt a user to leverage a biometric sensor input component of device 100 (e.g., sensor input component 110i) for authenticating that the user has the right to access NFC component 120. For example, biometric sensor input component 110i may include a fingerprint reader or other feature recognition device and may operate in conjunction with a feature-processing program accessible to control application module 330 (e.g., application 143). NFC component authentication option 417 may provide a virtual keypad or other data entry mechanism that may be utilized by the user to enter a personal identification number ("PIN") or other suitable code for authenticating that the user has the right to access NFC component 120. Various other authentication options may be provided by prompt 411, which itself may be provided by any suitable output component other than display output component 112a (e.g., an authentication prompt may be provided audibly to a user via audio speaker output component 112b, which may audibly ask the user to leverage a biometric sensor or enter a suitable code or password, which may enable display output component 112a to be off).

A user may respond to authentication prompt 411 for NFC component authentication information by providing any suitable NFC component user authentication data 331c to control application module 330 via any suitable input component 110 or any suitable combination of input components 110. For example, a user may respond to NFC component authentication option 413 by providing NFC component user authentication data 331c to control application module 330 via user interaction with biometric sensor input component 110i (e.g., by swiping his or her finger across a fingerprint scanner input of component 110i). As another example, a user may respond to NFC component authentication option 417 by providing NFC component user authentication data 331c to control application module 330 via user interaction with touch input component 110f of I/O component 114a (e.g., by entering a PIN or other code via the virtual keypad of FIG. 4C). It is to be understood that NFC component user authentication data 331c may be provided via any suitable input component 110 or any suitable combination of input components 110 (e.g., NFC component user authentication data 331c may be provided by a user pressing one or more mechanical input components 110a-110e in a specific order within a specific duration of time or speaking a specific phrase into microphone input component 110g, which may enable display output component 112a to be off).

Control application module 330 may be configured to analyze any received NFC component user authentication data 331c to determine whether the user is indeed authorized to enable NFC component 120 for an NFC communication 55 while device 100 is in the wallet power management mode. This may be done by comparing any received NFC component user authentication data 331c with a table of authentication information associated with NFC component 120. For example, received NFC component user authentication data 331c may be compared to information associated with general authentication of ISD 152 of NFC component 120, as opposed to specific authentication of a specific applet 153 of a specific SSD 154.

Once acceptable NFC component user authentication data 331c is received, control application module 330 may be configured to determine if multiple credentials are available to NFC component 120 and, if so, provide a user with an ability to select from among the multiple credentials that may be available to NFC component 120 for use during the wallet power management mode. For example, as shown in FIG. 1, NFC memory module 150 may include a first SSD 154, a second SSD 154a, and a third SSD 154b, each of which may be associated with a different credential provisioned on NFC component 120. In such an embodiment, in response to receiving an acceptable NFC component user authentication data 331c, control application module 330 may be configured to enable a user to select from among those three credentials of SSDs 154-154b. As shown in FIG. 3, in response to receiving acceptable NFC component user authentication data 331c, control application module 330 may generate and transmit an NFC credential selection request command 333c to at least one output component 112 of device 100. NFC credential selection request command 333c may be received by an output component 112 and may configure that output component 112 to prompt a user to provide device 100 with any suitable selection information that may indicate the user's selection of a particular available credential for use by NFC component 120 in the wallet power management mode. For example, as shown in FIG. 4D, NFC credential selection request command 333c may be received by display output component 112a and may configure display output component 112a to provide screen 400d to the user. Screen 400d may include first credential selection option 419, second credential selection option 421, third credential selection option 423, and/or cancel credential selection option 425. User selection of cancel credential selection option 425 may cause control application module 330 to once again provide screen 400c and/or await suitable NFC component user authentication data 331c.

If a user wishes to select a particular available credential for use, he or she may select the appropriate option of provided credential selection options 419, 421, and 423. Credential selection options 419, 421, and 423 may prompt a user to leverage any suitable input component 110 for selection of a particular credential option. For example, each one provided credential selection options 419, 421, and 423 may provide a virtual button or other data entry mechanism on I/O component 114a that may be utilized by the user to select a particular credential. Credential selection options 419, 421, and 423 may be provided by any other suitable output component other than display output component 112a of I/O component 114a (e.g., a list of credential selection options may be provided audibly to a user via audio speaker output component 112b, which may enable display output component 112a to be off).

A user may respond to credential selection options 419, 421, and 423 by providing any suitable credential selection response data 331d to control application module 330 via any suitable input component 110 or any suitable combination of input components 110. For example, a user may respond to credential selection options 419, 421, and 423 by providing credential selection response data 331d to control application module 330 via user interaction with touch input component 110f of I/O component 114a (e.g., by selecting one of the virtual buttons of FIG. 4D). It is to be understood that credential selection response data 331d may be provided via any suitable input component 110 or any suitable combination of input components 110 (e.g., credential selection response data 331d may be provided by a user pressing a specific one of mechanical input components 110a-110e that may be associated with a specific credential selection option and/or by a user swiping a specific finger across biometric sensor input component 110i that may be associated with a specific credential selection option, each of which may enable display output component 112a to be off).

Control application module 330 may be configured to analyze any received credential selection response data 331d to determine which of the available credentials the user wishes to utilize for an NFC communication 55 while device 100 is in the wallet power management mode. Once acceptable credential selection response data 331d is received for a specific available credential, control application module 330 may be configured to provide a user with an ability to authenticate his or her right to access that selected credential. For example, as shown in FIG. 3, in response to receiving acceptable credential selection response data 331d, control application module 330 may generate and transmit an NFC credential authentication request command 333d to at least one output component 112 of device 100. NFC credential authentication request command 333d may be received by any output component 112 and may configure that output component 112 to prompt a user to provide device 100 with any suitable authentication information that may prove the user's right to utilize the selected credential of NFC component 120 in the wallet power management mode. For example, as shown in FIG. 4E, NFC credential authentication request command 333d may be received by display output component 112a and may configure display output component 112a to provide screen 400e to the user. Screen 400e may include one or more suitable NFC credential authentication options (e.g., one or more of NFC credential authentication options 427 and 429) and/or cancel credential authentication option 431. User selection of cancel credential authentication option 431 may cause control application module 330 to once again provide screen 400d and/or await another acceptable credential selection response data 331d.

NFC credential authentication option 427 may prompt a user to leverage a biometric sensor input component of device 100 (e.g., sensor input component 110i) for authenticating that the user has the right to access the selected credential of NFC component 120. For example, biometric sensor input component 110i may include a fingerprint reader or other feature recognition device and may operate in conjunction with a feature-processing program accessible to control application module 330 (e.g., application 103 and/or application 143). NFC credential authentication option 429 may provide a virtual keypad or other data entry mechanism that may be utilized by the user to enter a personal identification number ("PIN") or other suitable code for authenticating that the user has the right to access the selected credential of NFC component 120. Various other authentication options may be provided by NFC credential authentication options 427 and 429, which themselves may be provided by any suitable output component other than display output component 112a (e.g., an authentication prompt may be provided audibly to a user via audio speaker output component 112b, which may enable display output component 112a to be off).

A user may respond to NFC credential authentication options 427 and/or 429 by providing any suitable NFC credential user authentication data 331e to control application module 330 via any suitable input component 110 or any suitable combination of input components 110. For example, a user may respond to NFC credential authentication option 427 by providing NFC component user authentication data 331e to control application module 330 via user interaction with biometric sensor input component 110i (e.g., by swiping his or her finger across a fingerprint scanner input of component 110i). As another example, a user may respond to NFC credential authentication option 429 by providing NFC credential user authentication data 331e to control application module 330 via user interaction with touch input component 110f of I/O component 114a (e.g., by entering a PIN or other code via the virtual keypad of FIG. 4E). It is to be understood that NFC credential user authentication data 331e may be provided via any suitable input component 110 or any suitable combination of input components 110 (e.g., NFC credential user authentication data 331e may be provided by a user pressing one or more mechanical input components 110a-110e in a specific order within a specific duration of time, which may enable display output component 112a to be off).

Control application module 330 may be configured to analyze any received NFC credential user authentication data 331e to determine whether the user is indeed authorized to utilize the selected credential of NFC component 120 for an NFC communication 55 while device 100 is in the wallet power management mode. This may be done by comparing any received NFC credential user authentication data 331e with a table of authentication information associated with the selected credential of NFC component 120. For example, received NFC credential user authentication data 331e may be compared to information associated with the SSD 154 associated with the specifically selected credential.

Once acceptable NFC credential user authentication data 331e is received, control application module 330 may be configured to enable NFC component 120 to utilize the selected and authorized credential for NFC communication 55 with terminal 10. As shown in FIG. 3, in response to receiving acceptable NFC credential user authentication data 331e, control application module 330 may enable the selected and authorized credential of NFC component 120 for use by generating and transmitting an NFC enable command 339 to NFC component 120. For example, such an NFC enable command 339 may be received by NFC component 120 and may be configured to enable NFC component 120 in any suitable way for utilizing the selected and authorized credential for NFC communication 55 with terminal 10 (e.g., by unlocking the appropriate applet 153, and/or by providing the appropriate data from that applet into data module 132, and/or by enabling antenna 116 (e.g., by powering booster 136), and/or by enabling antenna 134 for enabling NFC component 120 to utilize the selected credential for use as NFC communication 55).

Moreover, as shown in FIG. 3, in response to receiving acceptable NFC credential user authentication data 331e, control application module 330 may also generate and transmit NFC enabled data 333e to at least one output component 112 of device 100. NFC enabled data 333e may be received by an output component 112 and may configure that output component 112 to indicate to a user that the selected credential has been enabled for NFC communication 55 in the wallet power management mode. For example, as shown in FIG. 4F, NFC enabled data 333e may be received by display output component 112a and may configure display output component 112a to provide screen 400f to the user. Screen 400f may include credential enablement information 433 and/or a cancel credential enablement option 437. User selection of cancel credential enablement option 437 may cause control application module 330 to once again provide screen 400d while also disabling the currently enabled credential.

However, if a user does not choose to cancel the enabled credential via option 437, control application module 330 may allow the enabled credential to be potentially utilized by NFC component 120 for at least a certain duration of time (e.g., duration of time 435 as shown in FIG. 4F). Such duration of time 435 may be based on preferences of a user and/or based on preferences of a manufacturer of device 100, which may be defined or otherwise dictated by an application running on device 100 (e.g., application 103 and/or application 143). For example, duration 435 may vary based on a security level associated with the enabled credential (e.g., a credit card credential of option 419 may warrant a high security level and may demand a shorter duration 435, while a coupon credential of option 421 may warrant a medium security level and may demand a medium duration 435, and while a metro card credential of option 423 may warrant a low security level and may demand a longer or undefined duration 435). Such duration 435 may be clocked by control application module 330 and may be continuously updated as part of credential enablement information 433 by NFC enabled data 333e (e.g., on screen 400f) so as to indicate to the user for how much longer the credential may be enabled for potential use as NFC communication 55 before once again being disabled.

If, at any time during duration 435, the enabled credential is actually utilized by NFC component 120 as an NFC communication 55 (e.g., in response to terminal 10 receiving information associated with that enabled credential), NFC component 120 may generate and transmit NFC status information 341 to control application module 330, as shown in FIG. 3. Moreover, in response to receipt of such NFC status information 341, control application module 330 may generate and transmit NFC use data 333f to at least one output component 112 of device 100, as also shown in FIG. 3. NFC use data 333f may be received by an output component 112 and may configure that output component 112 to indicate to a user that the enabled credential has been used for NFC communication 55 in the wallet power management mode. For example, as shown in FIG. 4G, NFC use data 333f may be received by display output component 112a and may configure display output component 112a to provide screen 400g to the user. Screen 400g may include credential use information 439, which may include specific use explanation information 441. Such use information may be based on NFC use data 333f, which may be determined based on NFC status information 341 provided by NFC component 120. Such use information 439/441 may be indicative of any suitable characteristics of the use of the enabled credential, such as the name of the credential, the time of use, a description of terminal 10 that participated in the use, and the like. Various other types of use information 439/441 may be defined by NFC use data 333f and all such use information may be provided by any suitable output component other than display output component 112a (e.g., use information may be provided audibly to a user via audio speaker output component 112b, which may enable display output component 112a to be off).

Moreover, if the enabled credential is not actually utilized by NFC component 120 as an NFC communication 55 during duration 435, NFC component 120 may also generate and transmit NFC status information 341 to control application module 330. In response to receipt of such NFC status information 341 indicative of non-use, control application module 330 may generate and transmit NFC use data 333f to at least one output component 112 of device 100, as also shown in FIG. 3. NFC use data 333f may be received by an output component 112 and may configure that output component 112 to indicate to a user that the enabled credential was not used for NFC communication 55 within the allowed duration 435. For example, as shown in FIG. 4G, NFC use data 333f may be received by display output component 112a and may configure display output component 112a to provide screen 400g to the user. Screen 400g may include credential use information 439, which may include specific non-use explanation information 441. Such non-use information may be based on NFC use data 333f, which may be determined based on NFC status information 341 provided by NFC component 120. Such non-use information 439/441 may be indicative of the non-use (e.g., the duration allowed, etc.). Various other types of non-use information 439/441 may be defined by NFC use data 333f and all such non-use information may be provided by any suitable output component other than display output component 112a (e.g., non-use information may be provided audibly to a user via audio speaker output component 112b or haptically to a user via rumbler output component 112c, which may enable display output component 112a to be off).

After use or non-use of an enabled credential of NFC component 120 in the wallet power management mode and after the provision of NFC use data 333f to at least one output component 112 of device 100, control application module 330 may return electronic device 100 to its state at the outset of the wallet power management mode (e.g., by providing screen 400a of FIG. 4A and operating device 100 in a state where a user may provide a new suitable UI unlock input command 331a).

NFC component 120 may only include a single credential. In such instances, once acceptable NFC component user authentication data 331c is received by control application module 330 (e.g., as described with respect to FIG. 4C), rather than providing a user with an ability to select from among multiple credentials (e.g., as described with respect to FIGS. 4D and 4E), control application module 330 may be configured to immediately enable NFC component 120 to utilize the single credential for NFC communication 55 with terminal 10 by generating and transmitting an NFC enable command 339 to NFC component 120 as well as by generating and transmitting NFC enabled data 333e to at least one output component 112 of device 100 (e.g., as described with respect to FIG. 4F).

Moreover, in some embodiments, as mentioned above, NFC component 120 may be initially configured by NFC disabling command 321 to be in either a passive or active antenna mode when device 100 is initially entered into the wallet power management mode, such that an antenna of electronic device 100 may detect when device 100 is within an NFC response range D of terminal 10. In such embodiments, in addition to or as an alternative to waiting for a suitable UI unlock input command 331a from any suitable input component 110 (e.g., as described above with respect to FIG. 4A), control application module 330 may wait for suitable terminal detect data 343 from NFC component 120. Such terminal detect data 343 may be generated and transmitted by NFC component 120 to control application module 330 whenever NFC component 120 is in either a passive or active antenna mode during the wallet power management mode of device 100 and whenever such an NFC component 120 also detects that device 100 is within an NFC response range D of terminal 10. In such instances, control application module 330 may receive such terminal detect data 343 and may then be configured to provide a user with an ability to authenticate his or her right to enable NFC component 120 for conducting an NFC communication 55 with the detected terminal 10. For example, as shown in FIG. 3, in response to receiving terminal detect data 343, control application module 330 may generate and transmit NFC component authentication request command 333b to at least one output component 112 of device 100 (e.g., as described above with respect to FIG. 4C) for prompting a user to provide device 100 with any suitable authentication information that may prove the user's right to enable at least a portion of NFC component 120 in the wallet power management mode. Therefore, in some embodiments of wallet mode operation, a user may be prompted for authentication in response to NFC component 120 detecting a terminal 10. Whereas, in some other embodiments of wallet mode operation, NFC component 120 may not be enabled to detect a terminal 10 until after a user has been authenticated to use NFC component 120. Thus, control application module 330 may prompt a user for authentication of NFC component 120 in response to at least two different types of an authentication initiation event (e.g., either in response to receiving a suitable UI unlock input command 331a or in response to receiving suitable terminal detect data 343).

Figure 5A:
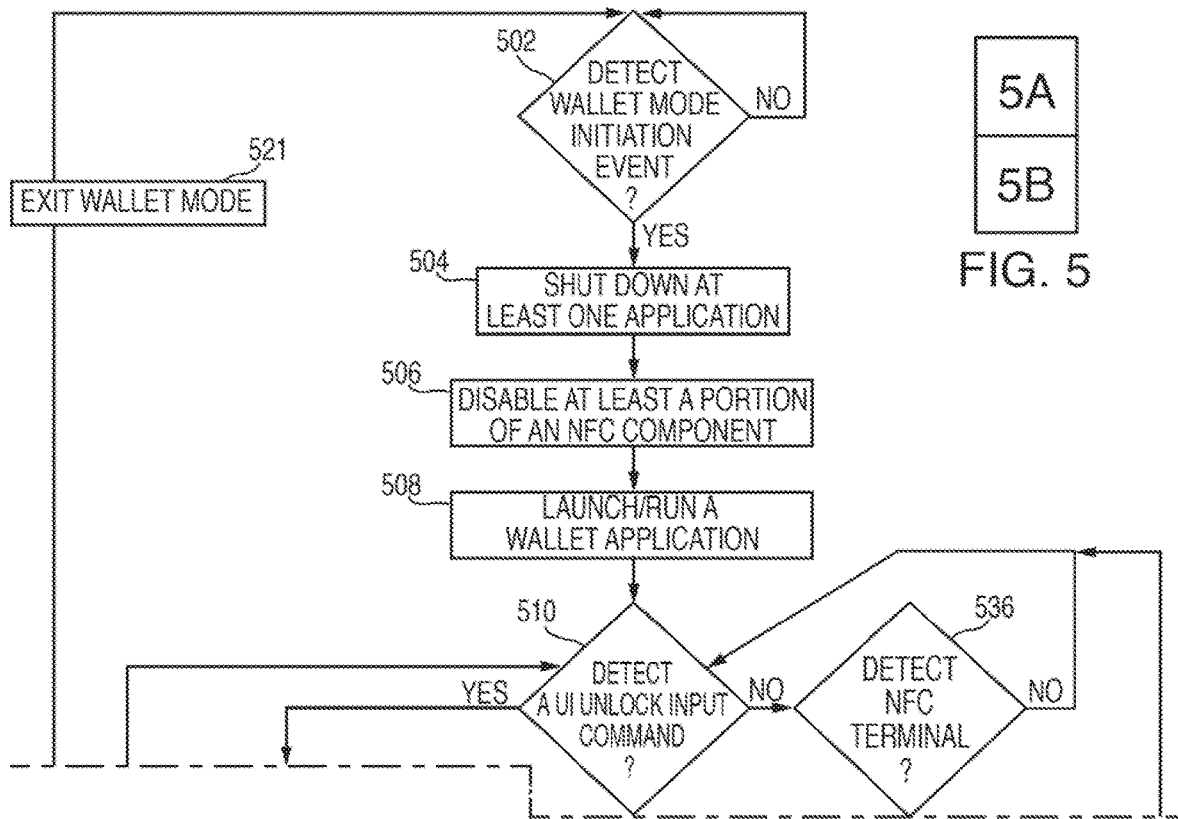
Figure 5B:
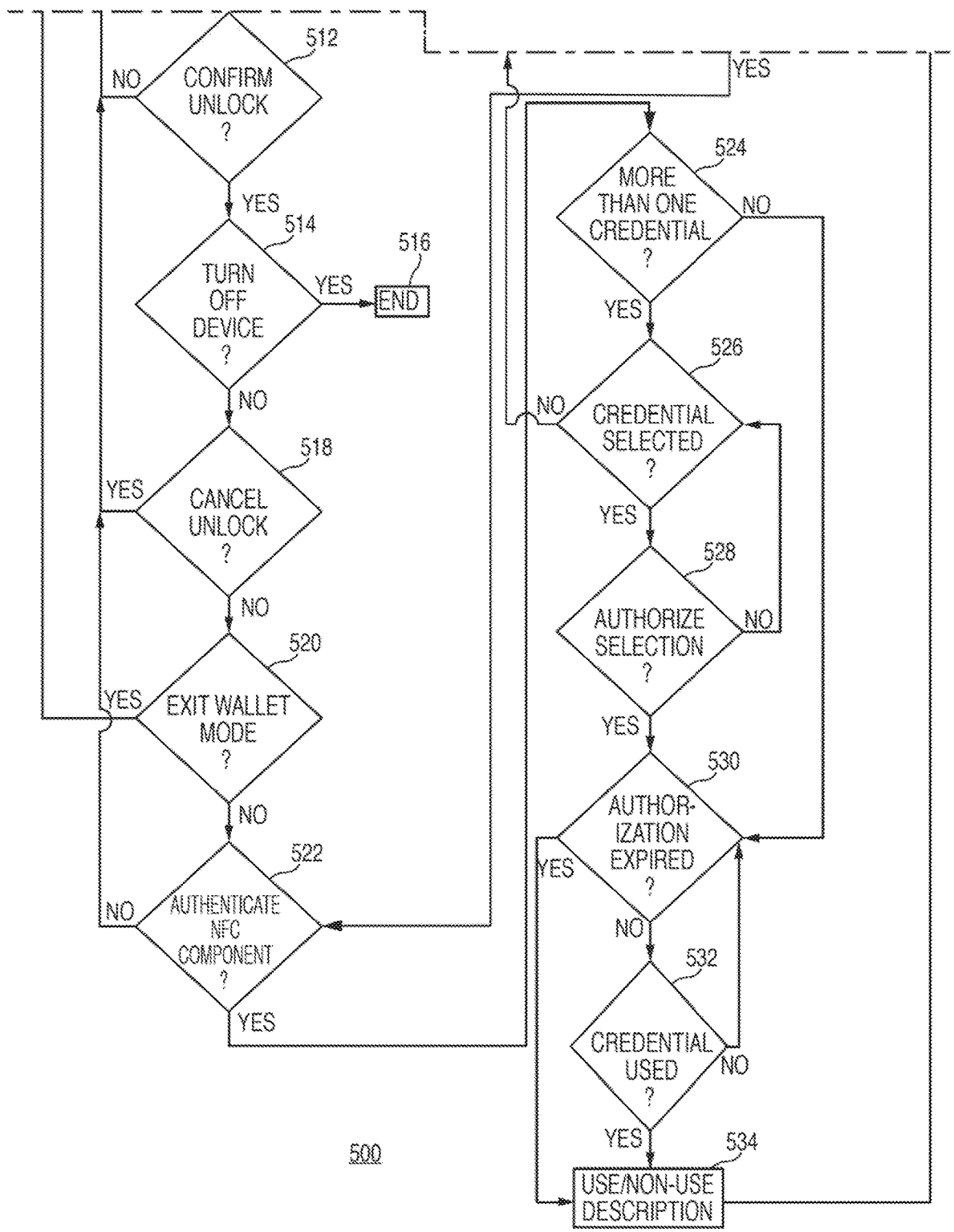

FIG. 5 is a flowchart of an illustrative process 500 for managing near field communications. At step 502 of process 500, an initiation event for a low power NFC or "wallet" power management mode may be detected. For example, as described with respect to FIG. 3, mode detection module 310 may be configured to detect such an initiation event based on received power level data 307 from power supply 108 and/or based on received input mode selection data 309 from input component 110. Process 500 may continuously repeat step 502 until an initiation event is detected.

Next, once such an initiation event is detected at step 502, process 500 may proceed to switch an electronic device to a wallet mode. This switch may include at least one of steps 504, 506, and/or 508. For example, process 500 may proceed from step 502 to step 504 and shut down at least one application that had been running. As described with respect to FIG. 3, switch application module 320 may generate and transmit an application disabling command 327 to processor 102 of electronic device 100 for shutting down one or more applications. Step 504 may additionally or alternatively include at least partially shutting down, removing power from, or otherwise at least partially disabling at least one function of any I/O component of the device (e.g., input component 110 and/or output component 112 of device 100).

Process 500 may then proceed from step 504 to step 506 and disable at least a portion of an NFC component. For example, as described with respect to FIG. 3, switch application module 320 may generate and transmit an NFC disabling command 321 to NFC component 120 for disabling one or more credentials of one or more SSDs 154, disabling antenna 134 or booster 136 of device module 130, or for disabling any other suitable element of NFC component 120 that may prevent at least one credential of NFC component 120 from being communicated as NFC communication 55 to terminal 10. Such disabling may reduce the power consumption of NFC component 120 and/or may prevent NFC component 120 from functioning in a passive state. Additionally or alternatively, the switching of an electronic device to a wallet mode of process 500 may include step 508, where an application for managing the device in the wallet mode may be launched and run by the device. For example, as described with respect to FIG. 3, switch application module 320 may generate and transmit launching command 329 to control application module 330 for launching and running at least one application (e.g., application 143) that may be specifically tailored to appropriately manage and/or otherwise control electronic device 100 in the low power NFC or wallet power management mode.

Next, once the electronic device is operating in the wallet low power mode, process 500 may proceed to step 510 for detecting a UI unlock input command. For example, as described with respect to FIG. 3, control application module 330 may be configured to wait for one or more suitable UI unlock input commands 331a from an input component 110 that may be indicative of a user's desire to interact with device 100 for potentially utilizing NFC component 120 for an NFC communication 55 in the wallet mode. If such a command is detected at step 510, process 500 may proceed to step 512 for confirming a user's desire to interact with device 100. For example, as described with respect to FIG. 3 and FIG. 4B, control application module 330 may generate and transmit a confirm UI unlock command 333a to at least one output component 112 to prompt a user to confirm his or her desire to interact with device 100 in the wallet mode. If such a desire is confirmed at step 512 (e.g., by control application module 330 receiving UI unlock confirmation data 331b), process 500 may proceed to step 514 for determining whether the user wishes to turn off the device, which he or she may do by proceeding to step 516 and ending process 500 by shutting down the device. However, if the user does not wish to shut down the device at step 514, process 500 may proceed to step 518 for determining whether the user wishes to cancel the unlock and quit interacting with the device, which he or she may do by having process 500 return to step 510. However, if the user does not wish to quit interacting with the device at step 518, process 500 may proceed to step 520 for determining whether the user wishes to exit the wallet mode, which he or she may do by having process 500 quit the mode at step 521 and return to step 502. However, if the user does not wish to exit the wallet mode at step 520, process 500 may proceed to step 522 for attempting to authenticate the user for enabling the NFC component. For example, each one of steps 512-522 may be described with respect to FIGS. 3 and 4C.

At step 522, process 500 may prompt a user to authenticate himself or herself for use of the NFC component. For example, as described with respect to FIGS. 3 and 4C, control application module 330 may generate and transmit an NFC component authentication request command 333b to at least one output component 112 of device 100. If the user is successfully able to be authenticated for use of the NFC component (e.g., by providing NFC component user authentication data 331c to control application module 330 via user interaction with an input component 110), process 500 may proceed to step 524, otherwise process 500 may return to step 510.

In some embodiments, a user may be authenticated by the same user interaction with device 100 that may generate a UI unlock input command 331a detected at step 510 such that process 500 may combine steps 510 and 522. For example, as described above with respect to FIG. 2, a biometric input component (e.g., biometric input component 110i) may be incorporated in another input component (e.g., home button input component 110a), and, as described with respect to FIGS. 3 and 4A, a UI unlock input command 331a may be a simple user interaction with home button input component 110a. Accordingly, such a user interaction with home button input component 110a for generating a UI unlock input command 331a may also be a user interaction with biometric sensor input component 110i for providing NFC component user authentication data 331c to control application module 330. In such instances, process 500 may jump from step 510 to step 524 (e.g., bypassing one or more of steps 512-522), as authentication step 522 may be unnecessary due to the NFC component user authentication data 331c detected at step 510 along with UI unlock input command 331a.

Additionally or alternatively, a user may be authenticated by the same user interaction with device 100 that may generate UI unlock confirmation data 331b detected at step 512 such that process 500 may combine steps 512 and 522. For example, as described above with respect to FIG. 2, a biometric input component (e.g., biometric input component 110i) may be incorporated in another I/O component of device 100 (e.g., touch input component 110f of I/O component 114a), and, as described with respect to FIGS. 3 and 4B, UI unlock confirmation data 331b may be a simple user interaction with touch input component 110f of I/O component 114a for sliding an element along a particular path of screen 400b. Accordingly, such a user interaction with touch input component 110f of I/O component 114a for generating UI unlock confirmation data 331b may also be a user interaction with biometric sensor input component 110i for providing NFC component user authentication data 331c to control application module 330. In such instances, process 500 may jump from step 512 to step 524 (e.g., bypassing one or more of steps 512-522), as authentication step 522 may be unnecessary due to the NFC component user authentication data 331c detected at step 512 along with UI unlock confirmation data 331b.

At step 524, process 500 may determine if more than one credential may be accessible to the NFC component authenticated by the user. If so, process 500 proceeds to step 526, otherwise process 500 may proceed to step 530. At step 526, process 500 may prompt a user to select amongst multiple credentials available to the NFC Component (e.g., control application module 330 may generate and transmit an NFC credential selection request command 333c to at least one output component 112 of device 100). If the user successfully selects one of the multiple credentials at step 526 (e.g., by providing any suitable credential selection response data 331d to control application module 330 via any suitable input component 110), process 500 may proceed to step 528, otherwise process 500 may return to step 522.

At step 528, process 500 may prompt a user to authenticate himself or herself for use of the selected credential. For example, as described with respect to FIGS. 3 and 4E, control application module 330 may generate and transmit an NFC credential authentication request command 333d to at least one output component 112 of device 100. If the user is successfully able to be authenticated for use of the selected credential (e.g., by providing NFC credential user authentication data 331e to control application module 330 via user interaction with an input component 110), process 500 may proceed to step 530, otherwise process 500 may return to step 526.

At step 530, process 500 may enable the authorized credential of the NFC component and determine whether a duration of the authorization has expired. For example, as described with respect to FIG. 3, control application module 330 may enable the selected and authorized credential of NFC component 120 for use by generating and transmitting an NFC enable command 339 to NFC component 120 to enable NFC component 120 in any suitable way for utilizing the selected and authorized credential for NFC communication 55 with terminal 10, where control application module 330 may allow the enabled credential to be potentially utilized by NFC component 120 for at least a certain duration of time 435. If the authorization has expired, process 500 may proceed from step 530 to step 534, otherwise process 500 may proceed from step 530 to step 532.

At step 532, process 500 may determine whether the authorized credential has been used in an NFC transaction. If the credential has been used in an NFC transaction, process 500 may proceed from step 532 to step 534, otherwise process 500 may return from step 532 to step 530 for determining whether the duration has expired. At step 534, process 500 may provide a description of the use or non-use of the authorized credential and may then return to step 510. For example, as described with respect to FIGS. 3 and 4G, if, at any time during duration 435, the enabled credential is actually utilized by NFC component 120 as an NFC communication 55 (e.g., in response to terminal 10 receiving information associated with that enabled credential), NFC component 120 may generate and transmit NFC status information 341 to control application module 330, and, in response to receipt of such NFC status information 341, control application module 330 may generate and transmit NFC use data 333f to at least one output component 112 of device 100. Moreover, as described with respect to FIGS. 3 and 4G, if the enabled credential is not actually utilized by NFC component 120 as an NFC communication 55 during duration 435, NFC component 120 may also generate and transmit NFC status information 341 to control application module 330, and, in response to receipt of such NFC status information 341 indicative of non-use, control application module 330 may generate and transmit NFC use data 333f to at least one output component 112 of device 100.

Returning to step 510, if no UI unlock input command is detected, process 500 may proceed from step 510 to step 536. At step 536, process 500 may attempt to detect an NFC terminal. For example, as described with respect to FIG. 3, control application module 330 may wait for suitable terminal detect data 343 from NFC component 120 that may be generated and transmitted by NFC component 120 to control application module 330 whenever NFC component 120 is in either a passive or active antenna mode during the wallet power management mode of device 100 and whenever such an NFC component 120 detects that device 100 is within an NFC response range D of terminal 10. If such a terminal is detected, process 500 may proceed from step 536 to step 522, otherwise process 500 may proceed from step 536 to step 510.

It is understood that the steps shown in process 500 of FIG. 5 are merely illustrative and that existing steps may be modified or omitted, additional steps may be added, and the order of certain steps may be altered.

FIG. 6 is a flowchart of an illustrative process 600 for managing near field communications on an electronic device. At step 602, process 600 may receive authentication information using an input component of the electronic device. For example, as described with respect to FIG. 3, control application module 330 may generate and transmit an NFC component authentication request command 333b to at least one output component 112 of device 100, in response to which a user may be authenticated for use of the NFC component (e.g., by providing NFC component user authentication data 331c to control application module 330 via user interaction with an input component 110). Next, at step 604, process 600 may power at least a first portion of a near field communication component of the electronic device based on the authentication information received at step 602. For example, as described with respect to FIG. 3, once suitable NFC component user authentication data 331c is received, control application module 330 may enable NFC component 120 for use by generating and transmitting an NFC enable command 339 to NFC component 120. Such an NFC enable command 339 may be configured to enable NFC component 120 by powering booster 136, which may thereby enable antenna 116 for communicating NFC communications 55 with terminal 10.

It is understood that the steps shown in process 600 of FIG. 6 are merely illustrative and that existing steps may be modified or omitted, additional steps may be added, and the order of certain steps may be altered.

FIG. 7 is a flowchart of an illustrative process 700 for managing near field communications on an electronic device. At step 702, process 700 may detect a low power mode initiation event. For example, as described with respect to FIG. 3, mode detection module 310 may be configured to detect such a low power mode initiation event based on received power level data 307 from power supply 108 and/or based on received input mode selection data 309 from input component 110. Next, at step 704, process 700 may disable an active element of the electronic device, such as any suitable portion or function of any suitable component of device 100. For example, as described with respect to FIG. 3, switch application module 320 may generate and transmit an NFC disabling command 321 to NFC component 120 for disabling one or more credentials of one or more SSDs 154, disabling antenna 134 and/or booster 136 of device module 130, and/or for disabling any other suitable element of NFC component 120 that may prevent at least one credential of NFC component 120 from being communicated as NFC communication 55 to terminal 10. Such disabling may reduce the power consumption of NFC component 120 and/or may prevent NFC component 120 from functioning in a passive state. As another example, as also described with respect to FIG. 3, switch application module 320 may generate and transmit an output component disabling command 323 to at least one output component 112 (e.g., at least one of output components 112a-112c) for shutting down, removing power from, or otherwise at least partially disabling at least one function of that output component 112. As yet another example, as also described with respect to FIG. 3, switch application module 320 may generate and transmit an input component disabling command 325 to at least one input component 110 (e.g., at least one of output components 110a-110i) for shutting down, removing power from, or otherwise at least partially disabling at least one function of that input component 110. As yet another example, as also described with respect to FIG. 3, switch application module 320 may generate and transmit one or more additional disabling commands (not shown) to at least one other component of device 100 (e.g., memory 104, communication component 106, antenna 116, etc.), such that, when received by that device component, that component disabling command may be configured to shut down, remove power from, or otherwise at least partially disable at least one function of that device component.

Next, at step 706, process 700 may close at least one active application that was running on the electronic device prior to the detecting of step 702. For example, as described with respect to FIG. 3, switch application module 320 may generate and transmit an application disabling command 327 to processor 102 of electronic device 100 for shutting down one or more applications (e.g., force quitting all non-native applications).

Next, at step 708, process 700 may run a low power mode application on the electronic device, where the running of the low power mode application may include receiving authentication information from an input component of the electronic device and enabling a near field communication component based on the received authentication information. For example, as described with respect to FIG. 3, switch application module 320 may generate and transmit launching command 329 to control application module 330 for launching and running at least one application (e.g., application 143) that may be specifically tailored to appropriately manage and/or otherwise control electronic device 100 in the low power NFC or wallet power management mode. While running this application, control application module 330 may generate and transmit an NFC component authentication request command 333b to at least one output component 112 of device 100, in response to which a user may be authenticated for use of the NFC component (e.g., by providing NFC component user authentication data 331c to control application module 330 via user interaction with an input component 110). Once suitable NFC component user authentication data is received, control application module 330 may enable NFC component 120 for use by generating and transmitting an NFC enable command 339 to NFC component 120.

It is understood that the steps shown in process 700 of FIG. 7 are merely illustrative and that existing steps may be modified or omitted, additional steps may be added, and the order of certain steps may be altered.

FIG. 8 is a flowchart of an illustrative process 800 for managing near field communications on an electronic device. At step 802, process 800 may detect a low power mode initiation event. For example, as described with respect to FIG. 3, mode detection module 310 may be configured to detect such a low power mode initiation event based on received power level data 307 from power supply 108 and/or based on received input mode selection data 309 from input component 110. Next, at step 804, process 800 may disable an element of the electronic device, such as any suitable portion or function of any suitable component of device 100. For example, as described with respect to FIG. 3, switch application module 320 may generate and transmit an NFC disabling command 321 to NFC component 120 for disabling one or more credentials of one or more SSDs 154, disabling antenna 134 and/or booster 136 of device module 130, and/or for disabling any other suitable element of NFC component 120 that may prevent at least one credential of NFC component 120 from being communicated as NFC communication 55 to terminal 10. Such disabling may reduce the power consumption of NFC component 120 and/or may prevent NFC component 120 from functioning in a passive state. As another example, as also described with respect to FIG. 3, switch application module 320 may generate and transmit an output component disabling command 323 to at least one output component 112 (e.g., at least one of output components 112a-112c) for shutting down, removing power from, or otherwise at least partially disabling at least one function of that output component 112. As yet another example, as also described with respect to FIG. 3, switch application module 320 may generate and transmit an input component disabling command 325 to at least one input component 110 (e.g., at least one of output components 110a-110i) for shutting down, removing power from, or otherwise at least partially disabling at least one function of that input component 110. As yet another example, as also described with respect to FIG. 3, switch application module 320 may generate and transmit one or more additional disabling commands (not shown) to at least one other component of device 100 (e.g., memory 104, communication component 106, antenna 116, etc.), such that, when received by that device component, that component disabling command may be configured to shut down, remove power from, or otherwise at least partially disable at least one function of that device component.

Next, at step 806, process 800 may identify an authentication initiation event. Then, at step 808, in response to the identification of step 806, process 800 may provide on an output component of the electronic device an output that requests user interaction for the enablement of a near field communication component. For example, as described with respect to FIG. 3, control application module 330 may prompt a user for authentication of NFC component 120 in response to at least two different types of an authentication initiation event (e.g., either in response to receiving a suitable UI unlock input command 331a or in response to receiving suitable terminal detect data 343).

It is understood that the steps shown in process 800 of FIG. 8 are merely illustrative and that existing steps may be modified or omitted, additional steps may be added, and the order of certain steps may be altered.

Moreover, one, some, or all of the processes described with respect to FIGS. 1-8 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., an optical data storage device, such as memory 104 and/or memory module 150 of FIG. 1). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of application 103 and/or application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of either one or both of NFC component 120 and NFC management subsystem 301 may be provided as a software construct, firmware construct, one or more hardware components, or a combination thereof. For example, any or each module of either one or both of NFC component 120 and NFC management subsystem 301 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of either one or both of NFC component 120 and NFC management subsystem 301 are merely illustrative, and that the number, configuration, functionality, and interconnection of existing modules may be modified or omitted, additional modules may be added, and the interconnection of certain modules may be altered.

As described above, various disabling commands may be configured to shut down, remove power from, or otherwise at least partially disable at least one function of various components of device 100. For example, input component disabling command 325 may be configured to shut down, remove power from, or otherwise at least partially disable at least one function of an input component 110, and application disabling command 327 may be configured to shut down, remove power from, or otherwise at least partially disable one or more applications currently being run by processor 102 (e.g., to force quit all non-native applications that were running on device 100 prior to the generation of that application disabling command 327), while NFC disabling command 321 may be configured to shut down, remove power from, or otherwise at least partially disable at least one function of NFC component 120. Similarly, various enabling commands may be configured to turn on, provide power to, or otherwise at least partially enable at least one function of various components of device 100. For example, NFC enable command 339 may be configured to turn on, provide power to, or otherwise at least partially enable at least one function of NFC component 120. Such commands may enable or disable one or more various elements (e.g., software constructs, firmware constructs, one or more hardware components, or a combination thereof) of a component of device 100 in one or more suitable ways for enabling or disabling at least one function of that component. For example, a software application running on processor 102 may be disabled by unloading that application from processor 102 and/or by turning off processor 102 altogether. As another example, an otherwise powered up NFC component 120 with at least one credential activated for use may be finally enabled for communicating NFC communications 55 by providing suitable power to booster 136, such that shared antenna 116 may be properly used to transmit such NFC communications 55. As yet another example, an otherwise powered up NFC component 120 with an antenna ready for transmitting NFC communications 55 may be finally enabled for communicating NFC communications 55 by enabling at least one credential of NFC component 120 for use in such communications 55. Enablement of at least one credential (e.g., activation of an applet 153) may be accomplished by powering up or otherwise turning on the memory element on which that credential is stored and/or by transmitting a key or other security data to the SSD of that credential in order to decrypt the information of that credential for use by NFC component 120 as NFC communications 55.

At least a portion of one or more of the modules of either one or both of NFC component 120 and NFC management subsystem 301 may be stored in or otherwise accessible to device 100 in any suitable manner (e.g., in memory 104 of device 100 (e.g., as at least a portion of application 103 and/or application 143)). Any or each module of either one or both of NFC component 120 and NFC management subsystem 301 may be implemented using any suitable technologies (e.g., as one or more integrated circuit devices), and different modules may or may not be identical in structure, capabilities, and operation. Any or all of the modules or other components of either one or both of NFC component 120 and NFC management subsystem 301 may be mounted on an expansion card, mounted directly on a system motherboard, or integrated into a system chipset component (e.g., into a "north bridge" chip).

Any or each module of either one or both of NFC component 120 and NFC management subsystem 301 may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module of either one or both of NFC component 120 and NFC management subsystem 301 may include its own processing circuitry and/or memory. Alternatively, any or each module of either one or both of NFC component 120 and NFC management subsystem 301 may share processing circuitry and/or memory with any other module of NFC component 120 and/or NFC management subsystem 301 and/or processor 102 and/or memory 104 of device 100.

As mentioned, an input component 110 of device 100 (e.g., input component 110*f*) may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112*a*). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112a) with graphical data to display a graphical user interface ("GUI") 180. GUI 180 may be configured to receive touch input via a touch input component 110f. Embodied as a touch screen (e.g., with display output component 112a as I/O component 114a), touch I/O component 110f may display GUI 180. Alternatively, GUI 180 may be displayed on a display (e.g., display output component 112a) separate from touch input component 110f. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110f, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

While there have been described systems, methods, and computer-readable media for managing near field communications, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method of operating an electronic device comprising:
   in response to a detection of a low power mode initiation event, disabling an input component of the electronic device, wherein the input component comprises at least one of a biometric sensor, a scanning sensor, or an image sensor for authenticating a user;
   while the input component is disabled, sensing a near field communication terminal with the electronic device;
   in response to the sensing, re-enabling the input component of the electronic device;
   after the re-enabling, receiving authentication information via the re-enabled input component; and
   enabling, using the received authentication information, a near field communication component of the electronic device for communication with the near field communication terminal.

2. The method of claim 1, further comprising:
   responsive to enabling the near field communication component, communicating, using the near field communication component, with the sensed near field communication terminal.

3. The method of claim 1, wherein enabling the near field communication component comprises activating an applet of a credential that is provisioned on the near field communication component.

4. The method of claim 1, further comprising:
   providing a user interface with the re-enabled input component prior to the receiving.

5. The method of claim 1, wherein enabling the near field communication component comprises modifying a state of the near field communication component to one of a passive state or an active state.

6. A device comprising:
   an input component for user authentication;
   a memory; and
   at least one processor configured to:
      in response to a detection of a low power mode initiation event, disable the input component, wherein the input component comprises at least one of a biometric sensor, a scanning sensor, or an image sensor for authenticating a user;
      while the input component is disabled, sense a near field communication terminal;

in response to the sensing, re-enable the input component;

after the re-enabling, receive authentication information with the re-enabled input component; and enable a near field communication component of the device using the received authentication information.

7. The device of claim 6, wherein the input component comprises a touch sensitive surface operative to receive touch input.

8. The device of claim 6, wherein the input component is one of a biometric sensor, a scanner, a camera, or a button.

9. The device of claim 6, wherein the at least one processor is further configured to:

responsive to enabling the near field communication component, communicate, using the near field communication component, with the sensed near field communication terminal.

10. The device of claim 6, wherein the at least one processor is configured to enable the near field communication component by activating an applet of a credential that is provisioned on the near field communication component.

11. The device of claim 6, wherein the at least one processor is further configured to:

provide a user interface with the re-enabled input component prior to receiving the authentication information.

12. The device of claim 6, wherein the at least one processor is configured to enable the near field communication component by modifying a state of the near field communication component to one of a passive state or an active state.

13. A non-transitory computer-readable medium comprising instructions that, when executed by one or more processors, cause the one or more processors to perform operations comprising:

in response to a detection of a low power mode initiation event by an electronic device, disabling an authentication input component of the electronic device, wherein the authentication input component comprises at least one of a biometric sensor, a scanning sensor, or an image sensor for authenticating a user;

while the authentication input component is disabled, sensing a near field communication terminal with the electronic device;

in response to the sensing, re-enabling the authentication input component of the electronic device;

after the re-enabling, receiving authentication information with the re-enabled authentication input component; and enabling a near field communication component of the electronic device using the received authentication information.

14. The non-transitory computer-readable medium of claim 13, wherein the authentication input component comprises a touch sensitive surface operative to receive touch input.

15. The non-transitory computer-readable medium of claim 13, wherein the authentication input component is one of a biometric sensor, a scanner, a camera, or a button.

16. The non-transitory computer-readable medium of claim 13, the operations further comprising:

responsive to enabling the near field communication component, communicating, using the near field communication component, with the sensed near field communication terminal.

17. The non-transitory computer-readable medium of claim 13, wherein enabling the near field communication component comprises activating an applet of a credential that is provisioned on the near field communication component.

18. The non-transitory computer-readable medium of claim 13, the operations further comprising:

providing a user interface with the re-enabled authentication input component prior to the receiving.

* * * * *